(12) United States Patent
Imai et al.

(10) Patent No.: US 6,770,991 B2
(45) Date of Patent: Aug. 3, 2004

(54) ROLL CONNECTOR STRUCTURE FOR A VEHICLE

(75) Inventors: Keisuke Imai, Kani (JP); Hiroshi Tsuge, Chiryu (JP)

(73) Assignee: Kabushiki Kaisha Tokai-Rika-Denki-Seisakusho (JP)

(*) Notice: Subject to any disclaimer, the term of this patent is extended or adjusted under 35 U.S.C. 154(b) by 156 days.

(21) Appl. No.: 09/752,444

(22) Filed: Jan. 3, 2001

(65) Prior Publication Data
US 2001/0007402 A1 Jul. 12, 2001

(30) Foreign Application Priority Data
Jan. 11, 2000 (JP) .................... 2000-002810

(51) Int. Cl.$^7$ .................................. H02K 11/00
(52) U.S. Cl. ............................ 310/71; 439/164
(58) Field of Search .................. 310/91, 71, 68 A; 439/164, 15

(56) References Cited

U.S. PATENT DOCUMENTS

| | | | | |
|---|---|---|---|---|
| 5,871,366 A | * | 2/1999 | Nishikigi et al. | 439/164 |
| 5,944,544 A | * | 8/1999 | Kuroda et al. | 439/164 |
| 5,971,782 A | * | 10/1999 | Masuda | 439/164 |
| 6,116,930 A | * | 9/2000 | Sakata | 439/164 |

* cited by examiner

Primary Examiner—Thanh Lam
(74) Attorney, Agent, or Firm—Nixon Peabody LLP; Thomas W. Cole

(57) ABSTRACT

In order to provide a roll connector structure for a vehicle in which there is no complicated or complex wiring in the steering wheel and the space within the steering wheel can be utilized efficiently, a roll connector structure for a vehicle including a stator side casing which is fixed to a steering column, a rotor side casing which is mounted to the stator side casing and rotates integrally with a steering wheel, and a cable which is accommodated between the stator side casing and the rotor side casing, wherein at least one steering switch is connected to the rotor side casing without wiring, is provided.

7 Claims, 4 Drawing Sheets

ROLL CONNECTOR STRUCTURE FOR A VEHICLE

BACKGROUND OF THE INVENTION

1. Field of the Invention

The present invention relates to a roll connector structure for a vehicle which reliably maintains an electric connection between a steering wheel and a vehicle body.

2. Description of the Related Art

Slip rings and roll connectors are known as members which reliably maintain electric connection between a steering wheel side and a vehicle body side. The slip ring has the merit that the manufacturing cost thereof is low because the structure is a simple structure in which a moving contact slides on a stationary contact. On the other hand, the slip ring has the disadvantage that the conductive state between the steering wheel side and the vehicle body side deteriorates due to the moving and stationary contacts being worn out in a case in which the slip ring is used over a long time. Therefore, as more and more vehicles have come to have air bag devices as a standard equipment, roll connectors have come to be used because the reliability of the roll connector is higher than that of the slip ring.

In FIG. 3, a conventional roll connector 100 and a steering wheel 102 are shown in order to explain a conventional method of connecting between the steering wheel and the vehicle body. As shown in FIG. 3, a horn switch (not shown in the drawing) and a cruise control switch 104, as well as an audio and telephone switch 106, which reflects an option that vehicle drivers have come to demand in recent years, are provided at the steering wheel 102. Wire harnesses (electric wires) 108 and 110 are pulled out from the cruise control switch 104 and the audio and telephone switch 106, respectively. The wire harnesses (electric wires) 108 and 110 are connected to connectors 114 and 116 which are provided in parallel the vicinity of a hub 112 of the steering wheel 102.

The roll connector 100 is fixed to a steering shaft (not shown in the drawing). The roll connector 100 is mounted at a position which is at the front side of the steering wheel 102. The roll connector 100 comprises a stator side casing 118, a rotor side casing 120, and a cable (not shown in the drawing). The stator side casing 118 has a substantially cylindrical configuration with a bottom. The rotor side casing 120 is mounted on the stator side casing 118 so as to be rotatable with respect to the stator side casing 118, and rotates integrally with the steering wheel 102. The cable is accommodated between the stator side casing 118 and the rotor side casing 120 and is wound in a spiral like manner. Connectors 122 and 124, which are connected to the connectors 114 and 116 provided at the steering wheel 102, are provided in parallel at the rotor side casing 120. Another connector 126, which is connected to an inflator of an electric ignition type air bag device, is provided at the rotor side casing 120, together with a wire harness 128.

As mentioned above, not only the horn switch and the cruise control switch 104 are provided at the steering wheel 102, but also various types of other switches, such as the audio and telephone switch 106 and/or a switch for a car navigation system, are provided at the steering wheel 102, which reflects manufacturers' effort to address the recent trends of requirements of drivers. Accordingly, many problems arise, such as the wiring of the wire harnesses becomes complicated and complex in the wiring structure applied to the conventional roll connector 100, and it becomes difficult to obtain sufficient space for the wire harnesses 108 and 110 and space for the connectors 114 and 116.

SUMMARY OF THE INVENTION

The present invention takes the facts mentioned above into consideration, and an object of the present invention is to provide a roll connector structure for a vehicle in which there is no complicated or complex wiring in the steering wheel and the space within the steering wheel can be utilized efficiently.

In accordance with a first aspect of the present invention, there is provided a roll connector structure for a vehicle including a stator side casing which is fixed to a steering column, a rotor side casing which is mounted to the stator side casing and rotates integrally with a steering wheel, and a cable which is accommodated between the stator side casing and the rotor side casing in a state of being wound in a spiral manner, wherein at least one steering switch is connected to the rotor side casing without wiring.

In accordance with a second aspect of the present invention, there is provided a roll connector structure for a vehicle according to the first aspect, wherein the rotor side casing has at least one connector, and the at least one steering switch has a plug portion corresponding to the at least one connector.

In accordance with a third aspect of the present invention, there is provided a roll connector structure for a vehicle according to the first aspect, wherein one portion of the at least one steering switch is formed integrally with the rotor side casing, and other portion of the at least one steering switch is connected to the one portion of the at least one steering switch.

In accordance with a fourth aspect of the present invention, there is provided a roll connector structure for a vehicle including a stator side casing which is fixed to a steering column, a rotor side casing which is mounted to the stator side casing and rotates integrally with a steering wheel, and a cable which is accommodated between the stator side casing and the rotor side casing, wherein at least one steering switch is connected to the rotor side casing without wiring.

In accordance with the first and forth aspects of the present invention, As the steering wheel is rotated, the rotor side casing rotates, accompanying a rotation of the steering wheel, in the same direction as the steering wheel, with respect to the stator side casing. In the aspects, because at least one steering switch is connected to the rotor side casing without wiring, the wire harness(es) and the connector(s) for the steering switch(es) is (are) no needed. Accordingly, in the aspects, the number of wirings of the wire harnesses and the number of the connectors at the steering wheel side can be reduced compared to those in the conventional structure of the roll connector.

DESCRIPTION OF THE PREFERRED EMBODIMENT

A description will be given below of an embodiment in accordance with the present invention with reference to FIGS. 1 and 2.

Figure 1:
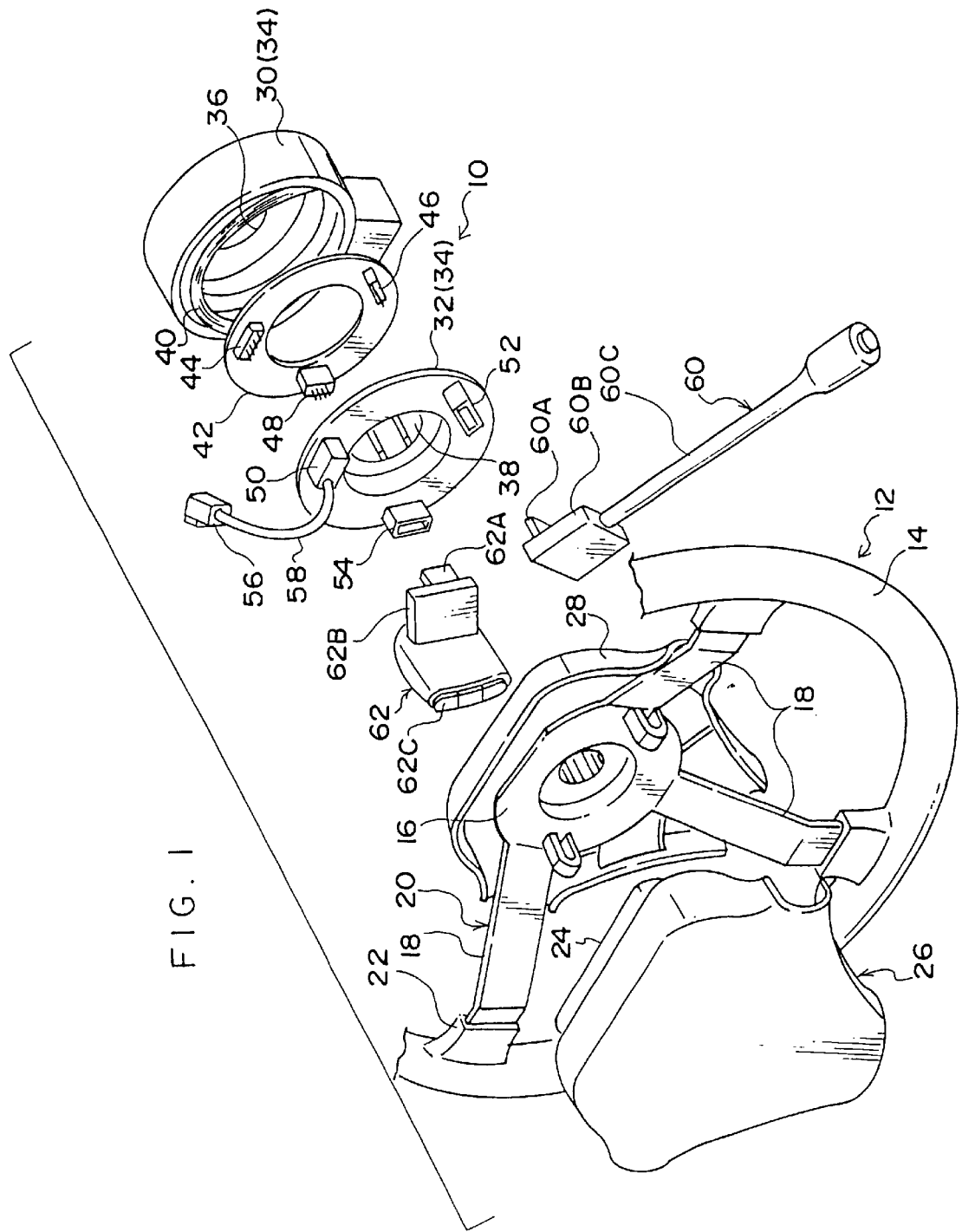
FIG. 1 is a perspective view illustrating the relationship between a steering wheel and a roll connector relating to the embodiment of the present invention, wherein the roll connector is illustrated in an exploded state.
Figure 2:
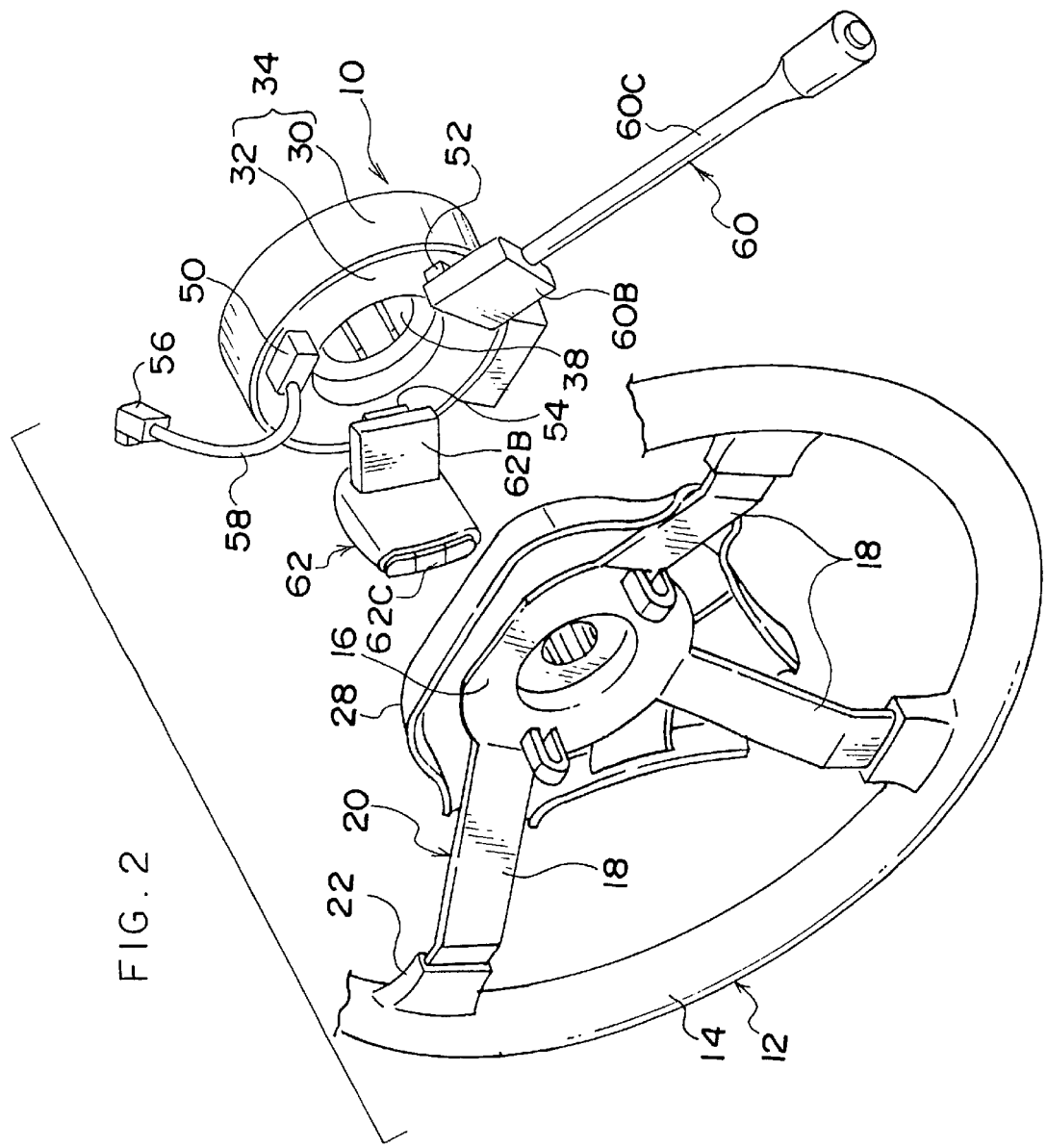
FIG. 2 is a perspective view illustrating the relationship between the steering wheel and the roll connector relating to the embodiment of the present invention, wherein the roll connector is illustrated in an assembled state.
Figure 3:
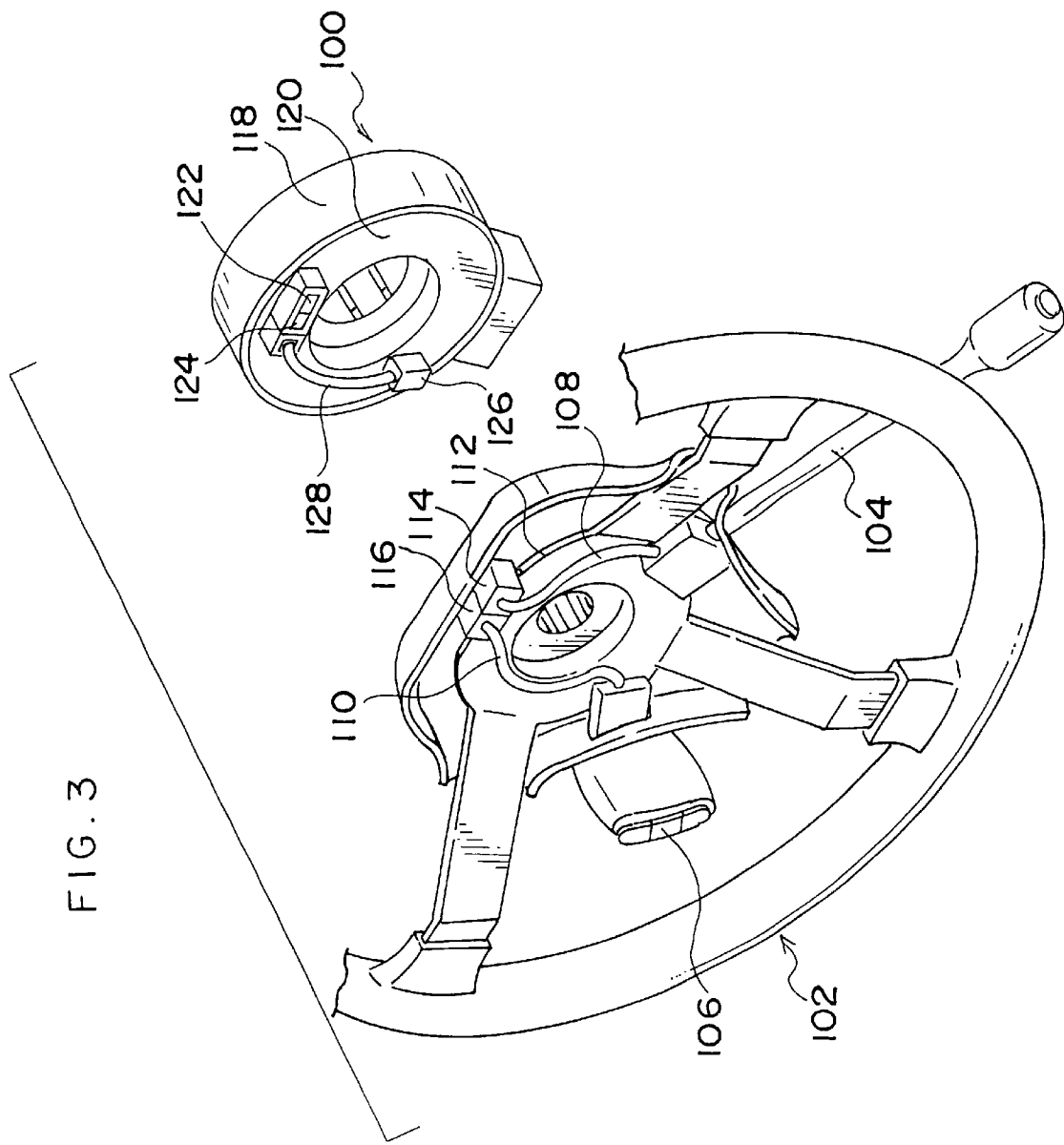
FIG. 3 is a perspective view illustrating the relationship between the steering wheel and the roll connector relating to a conventional example, wherein the roll connector is illustrated in an assembled state.

FIG. 1 is a perspective view illustrating the relationship between a steering wheel 12 and a roll connector 10 relating to an embodiment of the present invention, wherein the roll connector 10 is illustrated in an exploded state. FIG. 2 is a perspective view illustrating the relationship between the steering wheel 12 and the roll connector 10 relating to the embodiment of the present invention, wherein the roll connector 10 is illustrated in an assembled state.

As shown in these drawings, the steering wheel 12 is provided with a rim 14 which is ring shaped, a hub 16 fixed to a distal end portion of a steering shaft (not shown in the drawing) by a lock nut (not shown in the drawing), and a core 20 formed by three spokes 18 connecting the rim 14 and the hub 16. A portion of the rim 14 and portions of the spokes 18 of the core 20 are covered by resin layer 22. Further, a pad assembly 26, which is provided with an airbag device 24 which deploys an air bag toward a vehicle driver at a time when the vehicle rapidly decelerates, is provided at a center portion of the steering wheel 12 at the vehicle driver side (at the side close to the vehicle driver). Further, a lower cover 28 which is made of resin is provided at a center portion of the steering wheel 12 at a side thereof opposite to the vehicle driver side (further away from the vehicle driver).

The roll connector 10 is provided at the side, which side is opposite to the vehicle driver side, along an axial direction of the steering wheel 12. The roll connector 10 is provided with a casing 34 formed from a stator side casing 30 and a rotor side casing 32. The stator side casing 30 has a substantially cylindrical configuration with a bottom. The rotor side casing 32 closes the open end portion of the stator side casing 30. Through holes 36 and 38 are formed in axial central portions of the stator side casing 30 and the rotor side casing 32. The through holes 36 and 38 each have a relatively large diameter to allow a steering column (not shown in the drawing) to pass therethrough. The stator side casing 30 is fixed to the steering column side so as not to rotate relatively with respect to the steering column. On the other hand, the rotor side casing 32 is held at the stator side casing 30 so as to be relatively rotatable with respect to the stator side casing 30, and is integral with the steering wheel 12. Accordingly, when the steering wheel 12 rotates about an axis thereof, the rotor side casing 32 rotates integrally with the steering wheel 12.

A cable 40 wound in a spiral fashion is accommodated in an annular space which is formed by the stator side casing 30 and the rotor side casing 32. A contact plate 42 having a ring shaped, plate like configuration is attached to one end portion of the cable 40. A first connector 44, a second connector 46 and a third connector 48 are provided at a vehicle driver's side surface of the contact plate 42 such that intervals between adjacent connectors in a circumferential direction of the contact plate 42 are the same.

Further, a first connector 50, a second connector 52 and a third connector 54 are arranged on a vehicle driver's side surface of the rotor side casing 32 such that positions of the first connector 50, the second connector 52 and the third connector 54 correspond to positions of the first connector 44, the second connector 46 and the third connector 48 on the contact plate 42, respectively. The first connector 44 of the contact plate 42 is connected to the first connector 50 of the rotor side casing 32, A connector 56 for an air bag device, which is connected to an inflator (not shown in the drawing) of the air bag device 24, is pulled out from the first connector 50 of the rotor side casing 32 via a wire harness 58. The second connector 46 of the contact plate 42 is connected to the second connector 52 of the rotor side casing 32. A plug 60A, which is provided at a cruise control switch 60 which serves as a steering switch, is fit with the second connector 52 of the rotor side casing 32. The third connector 48 of the contact plate 42 is connected to the third connector 54 of the rotor side casing 32. A plug 62A, which is provided at an audio and telephone switch 62 which serves as a steering switch, is fit with the third connector 54 of the rotor side casing 32.

Namely, in the present embodiment, the cruise control switch 60 and the audio and telephone switch 62 are not provided at the steering wheel 12, but are provided at the rotor side casing 32 of the roll connector 10. Moreover, the cruise control switch 60 and the audio and telephone switch 62 are connected to the second connector 52 and the third connector 54 of the rotor side casing 32, in a plug-in manner (without wiring therebetween).

Next, a description will be given of the operation and effects of the present embodiment.

As the steering wheel 12 is rotated about the axis thereof, the rotor side casing 32 which is integral with the steering wheel 12 rotates, accompanying a rotation of the steering wheel 12, in the same direction as the steering wheel 12, with respect to the stator side casing 32.

In the present embodiment, the first connector 50, the second connector 52 and the third connector 54 are provided at the rotor side casing 32 of the roll connector 10, and the cruise control switch 60 serving as a steering switch and the audio and telephone switch 62 serving as a steering switch are connected to the second connector 52 and the third connector 54 of the rotor side casing 32, in a plug-in manner (without wiring therebetween). Thus, there is no need for wire harnesses (electric wiring) and connectors for the cruise control switch 60 and the audio and telephone switch 62. Accordingly, only the connector 56 and wire harness 58 are provided in the steering wheel 12. Therefore, in the present embodiment, the number of wirings of the wire harnesses and the number of the connectors can be reduced compared to those in the conventional structure of the roll connector for the vehicle. As the result, in the present embodiment, there is no complicated or complex wiring in the steering wheel, and the space within the steering wheel can be utilized efficiently.

Further, because the steering switches such as the cruise control switch 60 and the audio and telephone switch 62 are connected to the rotor side casing 32 without wiring, one of factors causing deficient electric conduct can be eliminated. Accordingly, failure of the electric system caused by the roll connector 10 can be prevented, and the reliability of the roll connector 10 can be improved.

Further, in the present embodiment, the cruise control switch 60 and the audio and telephone switch 62 are used as examples of the steering switches. However, the present invention is not limited to the same. Any types of switches can be used as the steering switches. For example, a switch for a vehicle air conditioner and / or a switch for a vehicle navigation system can be applied instead of the cruise control switch 60 and the audio and telephone switch 62.

Figure 4:
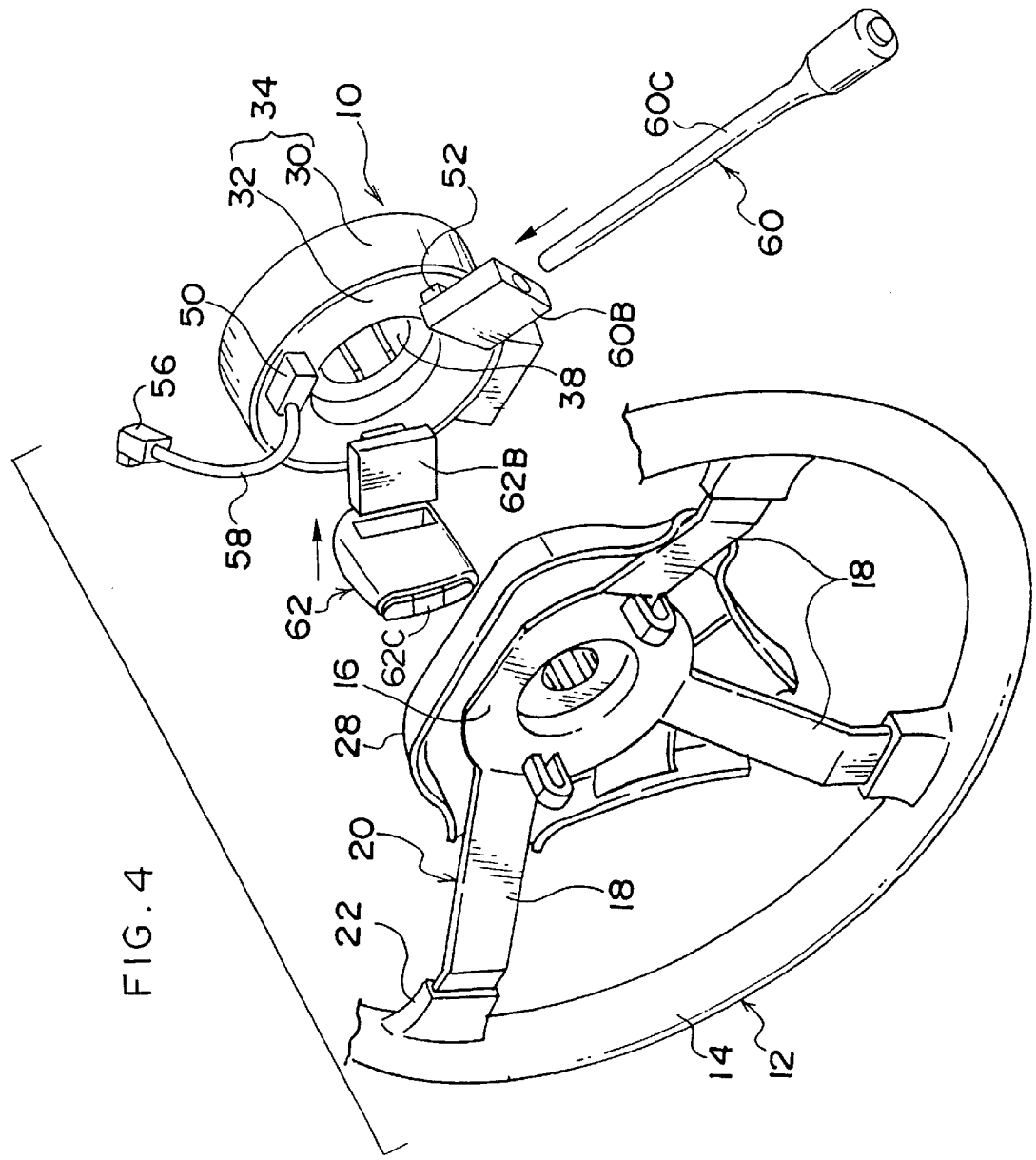
FIG. 4 is a perspective view illustrating the relationship between the steering wheel and the roll connector relating to the other embodiment of the present invention, wherein the roll connector is illustrated in an assembled state.

Further, in the present embodiment, the plug-in connection method, where the plug 60A of the cruise control switch 60 and the plug 62A of the audio and telephone switch 62 are fit into the second connector 52 and the third connector 54 of the rotor side casing 32, is applied. However, the present invention is not limited to the same. The present invention includes any embodiments in which wireless connection is possible. For example, a switch portion 60B of the cruise control switch 60 and a switch portion 62B of the audio and telephone switch 62 may be molded in advance so as to be integral with the rotor side casing 32. In this case, an operation lever portion 60C of the cruise control switch 60 and a operation lever portion 62C of the audio and telephone switch 62 are connected to the switch portions 60B and 62B, respectively (FIG. 4).

Further, in the present embodiment, two steering switches (namely, the cruise control switch 60 and the audio and telephone switch 62) are applied. However, the present invention is not limited to the same, and can be applied to three of more switches. Or, the present invention may be applied to a single arbitrary switch among a plurality of steering switches.

As described above, in the roll connector structure in the present invention, because at least one steering switch is connected to the rotor side casing without wiring (in a wireless manner), the number of wirings of the wire harnesses and the number of the connectors at the steering wheel side can be reduced compared to those in the conventional structure of the roll connector for the vehicle. As the result, in the present invention, there is no complicated or complex wiring in the steering wheel, and the space within the steering wheel can be utilized efficiently.

What is claimed is:

1. A roll connector structure for a vehicle including a stator side casing which is fixed to a steering column, a rotor side casing which is mounted to the stator side casing and rotates integrally with the steering wheel, and a cable which is accommodated between the stator side casing and the rotor side casing in a state of being wound in a spiral manner, wherein at least one steering switch is electrically connected to the rotor side casing without wiring.

2. A roll connector structure for a vehicle according to claim 1, wherein the rotor side casing has at least one connector, and the at least one steering switch has a plug portion corresponding to the at least one connector.

3. A roll connector structure for a vehicle according to claim 1, wherein one portion of the at least one steering switch is formed integrally with the rotor side casing, and other portion of the at least one steering switch is connected to the one portion of the at least one steering switch.

4. A roll connector structure for a vehicle including a stator side casing which is fixed to a steering column side member, a rotor side casing which is mounted to the stator side casing and rotates integrally with a steering wheel, and a cable which is accommodated between the stator side casing and the rotor side casing, wherein at least one steering switch is electrically connected to the rotor side casing without wiring.

5. A roll connector structure for a vehicle including a stator side casing which is fixed to a steering column side member, a rotor side casing which is mounted to the stator side casing and rotates integrally with a steering wheel, and a cable which is accommodated between the stator side casing and the rotor side casing, wherein at least one steering switch is electrically connected to a surface of a driver's side of the rotor side casing without wiring.

6. A roll connector structure for a vehicle according to claim 5, wherein the rotor side casing has at least one connector on the surface of a driver's side thereof, and the at least one steering switch has a plug portion corresponding to the at least one connector.

7. A roll connector structure for a vehicle according to claim 5, wherein one portion of the at least one steering switch is formed integrally with the surface of a driver's side of the rotor side casing, and the other portion of the at least one steering switch is connected to the one portion of the at least one steering switch.

* * * * *